(12) United States Patent
Amon et al.

(10) Patent No.: US 11,900,646 B2
(45) Date of Patent: Feb. 13, 2024

(54) METHODS FOR GENERATING A DEEP NEURAL NET AND FOR LOCALISING AN OBJECT IN AN INPUT IMAGE, DEEP NEURAL NET, COMPUTER PROGRAM PRODUCT, AND COMPUTER-READABLE STORAGE MEDIUM

(71) Applicant: SIEMENS AKTIENGESELLSCHAFT, Munich (DE)

(72) Inventors: Peter Amon, Munich (DE); Sanjukta Ghosh, Schwaig bei Nürnberg (DE); Andreas Hutter, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 17/279,087

(22) PCT Filed: Aug. 28, 2019

(86) PCT No.: PCT/EP2019/072960
§ 371 (c)(1),
(2) Date: Mar. 23, 2021

(87) PCT Pub. No.: WO2020/064253
PCT Pub. Date: Apr. 2, 2020

(65) Prior Publication Data
US 2022/0076117 A1 Mar. 10, 2022

(30) Foreign Application Priority Data

Sep. 24, 2018 (EP) .................................... 18196304

(51) Int. Cl.
*G06K 9/00* (2022.01)
*G06V 10/44* (2022.01)
(Continued)

(52) U.S. Cl.
CPC ............. *G06V 10/454* (2022.01); *G06N 3/08* (2013.01); *G06T 7/10* (2017.01); *G06T 7/70* (2017.01);
(Continued)

(58) Field of Classification Search
CPC ............................................. G06T 2207/30242
See application file for complete search history.

(56) References Cited

U.S. PATENT DOCUMENTS 10,169,677 B1 * 1/2019 Ren ......................... G06V 20/52
10,853,943 B2 * 12/2020 Laradji ............... G06F 18/2148
(Continued)

FOREIGN PATENT DOCUMENTS

| CN | 106845621 A | 6/2017 |
| CN | 107679503 A | 2/2018 |
| CN | 107967451 A | 4/2018 |

OTHER PUBLICATIONS

Arteta, Carlos, Victor Lempitsky, and Andrew Zisserman. "Counting in the wild." European conference on computer vision. Springer, Cham, 2016. pp. 1-56.
(Continued)

*Primary Examiner* — Hadi Akhavannik
(74) *Attorney, Agent, or Firm* — Lempia Summerfield Katz LLC

(57) ABSTRACT

Methods for generating a deep neural net and for localizing an object in an input image, the deep neural net, a corresponding computer program product, and a corresponding computer-readable storage medium are provided. A discriminative counting model is trained to classify images according to a number of objects of a predetermined type depicted in each of the images, and a segmentation model is trained to segment images by classifying each pixel according to what image part the pixel belongs to. Parts and/or
(Continued)

features of both models are combined to form the deep neural net. The deep neural net is adapted to generate, in a single forward pass, a map indicating locations of any objects for each input image.

15 Claims, 6 Drawing Sheets

(51) Int. Cl.
    *G06T 7/10*     (2017.01)
    *G06T 7/70*     (2017.01)
    *G06N 3/08*     (2023.01)
    *G06V 10/772*     (2022.01)
    *G06V 10/82*     (2022.01)
    *G06V 20/52*     (2022.01)

(52) U.S. Cl.
    CPC ............ *G06V 10/772* (2022.01); *G06V 10/82* (2022.01); *G06V 20/53* (2022.01); *G06T 2207/20081* (2013.01); *G06T 2207/20084* (2013.01); *G06T 2207/30242* (2013.01)

(56) References Cited

U.S. PATENT DOCUMENTS

| | | | | |
|---|---|---|---|---|
| 2016/0148372 A1* | 5/2016 | Itu | .......................... | G06F 18/217 |
| | | | | 382/128 |
| 2016/0307061 A1* | 10/2016 | Bulan | .................... | G06F 18/214 |
| 2017/0132769 A1* | 5/2017 | Barron | .................... | G06V 10/56 |
| 2017/0147905 A1* | 5/2017 | Huang | .................. | G06V 40/165 |
| 2018/0114071 A1* | 4/2018 | Wang | ................ | G06F 18/24133 |
| 2018/0225799 A1* | 8/2018 | Davis | .......................... | G06T 7/90 |
| 2019/0244060 A1* | 8/2019 | Dundar | ..................... | G06N 3/08 |
| 2021/0389499 A1* | 12/2021 | Zhang | ...................... | E21B 25/00 |

OTHER PUBLICATIONS

European Search Report for European Application No. 18196304. 2-1207 dated Apr. 3, 2019.

Ghosh, Sanjukta, et al. "Deep Counting Model Extensions with Segmentation for Person Detection." ICASSP 2019-2019 IEEE International Conference on Acoustics, Speech and Signal Processing (ICASSP). IEEE, 2019. pp. 2032-2036.

He, Shengfeng, et al. "Delving into salient object subitizing and detection." Proceedings of the IEEE International Conference on Computer Vision. 2017. Sections 1, 3, 4; figure 1; p. 1061, left-hand column, paragraph 3—p. 1064, left-hand column, paragraph 2; figures 1-6; pp. 1065, right-hand column, last paragraph—pp. 1066, left-hand column, paragraph 1. pp. 1-54.

International Search Report and the Written Opinion for International Patent Application PCT/EP2019/072960 dated Dec. 18, 2019.

Khan, Salman, et al. "A guide to convolutional neural networks for computer vision." Synthesis Lectures on Computer Vision 8.1 (2018): 1-209.

Kolesnikov, Alexander, and Christoph H. Lampert. "Seed, expand and constrain: Three principles for weakly-supervised image segmentation." European conference on computer vision. Springer, Cham, 2016. pp. 1-20.

Long, Jonathan, Evan Shelhamer, and Trevor Darrell. "Fully convolutional networks for semantic segmentation." Proceedings of the IEEE conference on computer vision and pattern recognition. 2015. pp. 3431-3440.

Oquab, Maxime, et al. "Is object localization for free?—weakly-supervised learning with convolutional neural networks." Proceedings of the IEEE conference on computer vision and pattern recognition. 2015. pp. 685-694.

Ruder, Sebastian. "An overview of multi-task learning in deep neural networks." arXiv preprint arXiv:1706.05098 (2017). pp. 1-10/.

Seguí, Santi, Oriol Pujol, and Jordi Vitria. "Learning to count with deep object features." Proceedings of the IEEE Conference on Computer Vision and Pattern Recognition Workshops. 2015. pp. 90-96.

Zhang, Jianming, Filip Malmberg, and Stan Sclaroff. Visual saliency: from pixel-level to object-level analysis. Springer International Publishing, 2019. pp. 1-138.

\* cited by examiner 2,53

30 30

54  56

57 55

58  56

55

2,59  30 60 30

60

55 62 56 61

56  56

55  56 63

56  56

METHODS FOR GENERATING A DEEP NEURAL NET AND FOR LOCALISING AN OBJECT IN AN INPUT IMAGE, DEEP NEURAL NET, COMPUTER PROGRAM PRODUCT, AND COMPUTER-READABLE STORAGE MEDIUM

This application is the National Stage of International Application No. PCT/EP2019/072960, filed Aug. 28, 2019, which claims the benefit of European Patent Application No. EP 18196304.2, filed Sep. 24, 2018. The entire contents of these documents are hereby incorporated herein by reference.

BACKGROUND

The present embodiments relate to a method for generating a deep neural net, a method for localizing an object in an input image, a deep neural net for localizing objects in images, a corresponding computer program product, and a corresponding computer readable storage medium.

Many tasks and applications require or may benefit from automatically processing images or image data to detect, to localize, and to classify objects, and/or to segment the images accordingly. Detection of a specific category or type of objects like persons or vehicles is, however, often challenging for general-purpose object detection algorithms. Today, deep neural nets have achieved success in various computer vision applications for image and video analytics. While a good performance of neural nets or a respective deep model has been demonstrated on publicly available, specially prepared data sets, performance typically drops in practical scenarios and applications. In an attempt to better generalize or deal with real-world situations involving clutter in the depicted scenes, partially occluded objects, and/or relatively small objects, a complexity of architectures of the deep neural networks has steadily increased, as have the complexity of training procedures, a need for training data, and annotation requirements of the training data. Achieving better performance in terms of required processing time and quality or accuracy of the results is always a desirable goal. This is especially true for application that requires real-time or near real-time reliable performance and/or that are safety-sensitive like, for example, video surveillance and autonomous driving.

In the past, object localization or semantic segmentation of images using deep learning has been achieved with varying success through fully supervised techniques as well as through weakly supervised techniques.

In fully supervised techniques, pixel-level labels are used for generating localization or segmentation maps. Often, when encoder-decoder architecture is involved, the encoder includes a series of convolutional and pooling layers, and the decoder includes a series of deconvolutional and unpooling layers. The deep neural network is then driven by a loss-function involving pixel-wise labels or annotations. There are some variants to this architecture where connections from the encoder to the decoder side exist. Some of the techniques use fully convolutional networks or SegNet and variants like Bayesian SegNet and U-Net.

Weakly supervised methods involve using an attention map generated by a classification network for object localization. This provides that image-level labels are used for training the classification network, which is then used to generate the attention map. Various techniques have been developed to come up with the attention maps. These techniques include deconvolution, CAM, and Grad-CAM. All of these methods involve a complete or partial backward pass through a trained deep neural network to generate the attention maps. Examples for some of these weakly supervised techniques for object localization and image segmentation are described in "Is object localisation free? Weakly-supervised learning with convolutional neural networks" by M. Oquab, et al. in CVPR, 2015, and "Seed, expand and constrain: Three principles for weakly-supervised image segmentation" by A. Kolesnikov and C. H. Lampert in ECCV, 2016.

SUMMARY AND DESCRIPTION

The scope of the present invention is defined solely by the appended claims and is not affected to any degree by the statements within this summary.

The present embodiments may obviate one or more of the drawbacks or limitations in the related art. For example, automated object localization in images is enabled with improved performance over the currently available state-of-the-art.

A method according to the present embodiments for generating (e.g., for creating or preparing) a deep neural net for localizing objects of a predetermined type in an input image includes multiple acts. In one act of this method, a discriminative deep counting model (e.g., a discriminative deep neural net for counting objects) is trained to classify images according to a respective number of objects of the predetermined type depicted in each of the images. Therein, the counting model is trained for or with at least two (e.g., at least three or more) different classes corresponding to different numbers of objects of the predetermined type. The counting model is, in other words, trained to focus on the count or number of objects of the predetermined type as a distinguishing feature between images. The classes are typically represented as nodes of a fully connected output layer or classification layer of the counting model. In one embodiment, the counting model (e.g., the classes the counting model may assign to an input image) have a compositional class structure.

In another act of the method, a deep segmentation model is trained to segment images by classifying each pixel of a respective image according to what depicted object or part of the respective image the pixel belongs to. The segmentation model (e.g., a deep neural net for segmenting images) may be trained for or with at least two classes, such as foreground and background. Accordingly, the trained segmentation model may classify each pixel of an image as belonging to a foreground or as belonging to a background of the respective image. Therein, the foreground may be defined as an object or objects of the predetermined type, while the background may be defined as a scene in which the foreground (e.g., the object or objects of the predetermined type) is embedded. The background may, in other words, include every other part of the respective image that does not represent or depict the object or objects of the predetermined type.

In another act of the method according to the present embodiments, parts of the counting model and the segmentation model are combined to form the deep neural net, where the deep neural net is structured or configured or adapted to generate a map indicating locations of any objects of the predetermined type for each processed input image. In one embodiment, the deep neural net is structured or configured to generate the map in a single forward pass of the respective input image through the deep neural net. Different ways of combining the counting model and the segmentation model or parts thereof with each other are possible. Some of these different ways will be described in more detail further down below. For example, the counting model and the segmentation model may be combined before or after training of the models. Correspondingly, the described acts of the method according to the present embodiments may be performed in the order in which the acts have been described or in a different order.

Depending on the way in which the counting model and the segmentation model are combined with each other, the map generated by the resulting deep neural net may be a localization map or attention map, or the map may be a segmentation map of or for the respective processed input image.

The predetermined type of the object is essentially arbitrary, providing that the deep neural net or corresponding parts may be trained or adapted for localizing objects of essentially any type or kind. Typical examples of objects or types of objects that may be localized or indicated in the generated maps include persons or people, vehicles such as cars, buses, bikes, and the like, road markings, street signs, buildings, animals, tools, workpieces, and so on.

Training of the counting model and the segmentation model may be done through known methods like automatic differentiation or specifically backpropagation.

By combining at least parts of the deep counting model and at least part of the deep segmentation model into the deep neural net, the individual strengths and benefits of both different types of models may be leveraged for the task of localizing objects in images. This results in improved performance (e.g., an improved quality or accuracy of the object localization or image segmentation). Strengths and benefits of the counting model (e.g., the feature extractor trained for or as part of the deep counting model) include the ability to detect relatively small and/or partially occluded objects, which is typically a problem for other object detection algorithms. Another advantage of the counting model is the ability to detect or localize objects at varying scales without additional acts that are typically necessary in other detection techniques. This is the case because 'count' or 'number' as a feature is invariant to scale (e.g., to size of the respective object relative to an overall size of the respective image, and/or in terms of a number of pixels representing the respective object). Another advantage of the counting model is the fact that the counting model may relatively easily be trained using training images with only a single label at an image level for annotation (e.g., the respective count or number of objects of the predetermined type depicted in the respective training image). This provides that weakly supervised training of the counting model is possible so that the deep neural net may be generated with manageable effort.

The segmentation model is able to achieve a finer or fuller segmentation of the object of the predetermined type (e.g., across different scales). Also, with increasingly complex images, the segmentation model is a way of guiding the deep neural net at the pixel-level.

Overall, by combining parts and/or features of the deep counting model and the deep segmentation model, the deep neural net may achieve background segmentation with significantly improved accuracy as compared to using either only a counting model or using only a segmentation model. Further, forming the deep neural net from or with parts and/or features of the counting model and the segmentation model opens up possibilities for achieving a computational advantage since it is possible to avoid a decoder pass through various deconvolutional and unpooling layers of a typical segmentation network. This may enable real-time or near real-time implementations or application of the present embodiments. In other words, using the present embodiments, the result (e.g., the localization map or segmentation map) is obtained in a single forward pass of each input image through the deep neural net at inference time without the need for a complete or partial backward pass or a pass through a decoder as is common with typical known segmentation networks. Since it is possible to only use convolutional layers of the counting model and the segmentation model to form the deep neural net, it becomes possible or computationally feasible to process images of essentially arbitrary size or dimensions (e.g., at least images of significantly larger sizes than may feasibly be processed using traditional segmentation networks). Another advantage of the present embodiments lies in the fact that synthetic images may be used for training as will also be described in more detail further down below. It is found that synthetic images may successfully be used to teach the deep neural net or corresponding parts (e.g., the counting model and the segmentation model) meaningful features of the objects of the predetermined type resulting in the ability of the deep neural net to generalize to other images or data sets not seen during training at all.

Compositionality and specifically multiplicity as a form of compositionality may be used to enable the counting model or the corresponding feature extractor to reliably focus on the objects of the predetermined type to be counted. While it is known that providing more data to a deep neural network during training with diverse statistics may generally result in a better model, here, the approach to guide the deep counting model to learn meaningful features pertaining to the object of the predetermined type by using the principle of compositionality and specifically of multiplicity in the class structure and in the training images or training data used for training the deep counting model is taken.

Compositionality in the scope of the present embodiment provides that each subsequent class or object category is a superset of the respective previous class or object category. A traditional or conventional simple classification network may typically classify images into two classes, where class 0 corresponds to no object of the predetermined type being depicted or present in the respective image, and class 1 corresponds to a presence of at least one object of the predetermined type in the respective image. Instead of using such a traditional segmentation network, here, the number of classes is increased to at least three or more. The additional class or classes correspond to different numbers or counts of the object of the predetermined type. For example, class 1 may correspond to exactly one object, class 2 may correspond to exactly 2 objects, class 3 may correspond to exactly three objects of the predetermined type, and so on.

When a discriminative neural network or model is trained, the discriminative neural network is to disentangle the representations corresponding to the different classes that, in this case, are then different counts or numbers of depicted objects of the predetermined type. In the process, the model learns to focus on the object since the feature that differentiates between the different classes is an 'object instance' itself. By introducing multiplicity as a form of compositionality in this manner, each subsequent class is a superset of the previous class, and the point of difference between the classes is the number of objects as far as a cost function and the classifier of the deep counting model are concerned, but is the object of the predetermined type itself or multiple objects of the predetermined type themselves as far as the feature extractor of the deep counting model is concerned. Having more than one instance of the same type of object within and across classes may be realized by 'visual similarity' as well as 'semantic similarity' across classes. This will be explained in more detail further down below.

In a development, the counting model and the segmentation model are trained in combination with each other. For this purpose, a counting model head and a segmentation model head are arranged in parallel to each other downstream of a shared feature extractor for the counting model and the segmentation model. Therein, the counting model head includes at least one fully connected layer, the segmentation model head includes at least one transposed convolutional layer (e.g., also known as a deconvolutional layer) and/or at least one convolutional layer, and the shared feature extractor includes multiple convolutional layers. Training images are then fed through the shared feature extractor to each of the model heads. In other words, a combined architecture is used for training the counting model and the segmentation model using the same feature extractor at the same time for both models. An output of the shared feature extractor is then branched off. Along one branch, the output of the shared feature extractor is provided as an input to the counting model head, while along another, parallel branch, the output of the shared feature extractor is provided as an input to the segmentation model head.

This provides that the counting model includes the shared feature extractor and the counting model head, while the segmentation model includes the shared feature extractor and the segmentation model head. Each of the two models may also include additional part or features, such as, for example, a respective classifier (e.g., a classification layer serving as a respective output layer). The shared feature extractor may then be used as the respective part of both models to form the deep neural net.

The described architecture effectively forms a multi-task deep neural net trained with a counting loss function as well as a segmentation loss function. The resulting deep neural net has, for example, a particularly short pipeline that results in fewer necessary computations and quicker processing of input images.

At training time, the counting loss function for training the counting model part helps to eliminate background features effectively, while the segmentation loss function for training the segmentation part helps to obtain a more accurate and fuller segmentation of the objects of the predetermined type (e.g., of the foreground object in the sense of the present application). An overall or combined loss function for the deep neural net or the shared feature extractor may then be understood or represented as a weighted combination of the counting loss function and the segmentation loss function. By adjusting respective weighting factors, a respective impact of the counting part and the segmentation part may be varied to tune the resulting shared feature extractor or deep neural net for various use cases or applications.

In one embodiment, the segmentation model or segmentation part does not need to include a full-fledged decoder or full stack of deconvolution or unpooling layers as is common for traditional segmentation networks. This simplification is based on the insight that the shared feature extractor may already generate as an output a decent localization map because the shared feature extractor is trained using the counting loss function. It would not be possible to use this simplification without the property of the feature extractor that is trained for or as part of the deep counting model to provide a relatively good object localization.

In a further development of the present embodiments, an upsampling stage or upsampling module is added after a final convolutional layer of the deep neural net. The upsampling module is adapted to take the generated map as an input and to generate from that an upsampled map. For example, the upsampling module is added after the training or training phase is completed. In other words, the upsampling module is only added for an inference phase (e.g., for a productive use or application of the deep neural net where previously unknown or unseen input images are to be processed). The upsampling module may use or include a traditional or conventional image processing algorithm or image processing program. The upsampling module does, in other words, not necessarily need to use or be based on machine learning or a neural net architecture. This may lead to improved image processing performance in terms of required processing time and to increased flexibility in terms of the ability to process input images of essentially arbitrarily sizes or dimensions.

It is, however, also possible to use one or more deconvolutional layers as or as part of the upsampling module. In this case, the up sampling module may be added before the training phase to also train these layers.

Typically, a segmentation network generates or predicts a segmentation map at the same or almost the same resolution as the respective input image. The deep counting model, however, typically generates or predicts an attention or localization map at a lower resolution. Since, in the present embodiments, the counting model and the segmentation model are combined with each other, the addition of the upsampling module is particularly advantageous to obtain a high quality localization or segmentation map as a final output or result.

In a further development of the present embodiments, the counting model and the segmentation model are trained sequentially. This provides that first, one of the models is trained, and then, the respective other of the models is trained afterwards. Depending on an order of the training, an attention map or localization map generated by the trained counting model is used to train the segmentation model. If, in other words, the counting model is trained first, cues generated by the trained counting model are used to train the segmentation model. The cues (e.g., the attention map or localization map) are generated as an output of a feature extractor of the counting model (e.g., as an output of a final convolutional layer just upstream of the final one or more fully connected layers including a classification layer of the counting model).

If the segmentation model is trained first, a segmentation map generated by the trained segmentation model is used to train the counting model.

Training the two models sequentially may possibly be achieved easier than a combined training of the two models at the same time. Another advantage of training both models sequentially is that after the training of one model is completed, a test or verification of the result may be performed at this intermediate stage in the training process. While the two models are trained sequentially (e.g., at different times), the two models are effectively not trained independently of each other since the respective output of the firstly trained model is used to train the second model, thereby influencing the second model. In this sense, a feature of the first model is still used in the combined deep neural net even if only the secondly trained model or a corresponding feature extractor, and not the feature extractor of the firstly trained model, is used to form the combined deep neural net.

By training the two models sequentially, in this way, the advantages described in connection with the combined training of the two models may still be achieved or leveraged.

Another advantage of the sequencing at training time is that at a later inference time or inference phase, the two models may easily be separated so that it is possible, without any additional effort, to, for example, use only the trained segmentation model when the counting model has been trained first. In this scenario, the counting model is not required during the inference phase. This provides that hardware or computational requirements may be lower for the inference phase, which opens up additional use cases or applications for the present embodiments.

In a further development of the present embodiments, the counting model and the segmentation model are trained independently of each other. The deep neural net is then formed by combining at least the respective feature extractors of both models in a serial or sequential arrangement, where each feature extractor includes multiple convolutional layers. In other words, one of the feature extractors is arranged downstream of the other feature extractor.

If the feature extractor of the counting model is used as a first part of the serial arrangement, the feature extractor of the segmentation model is then used on an attention or localization map generated as an output of the feature extractor of the counting model. This attention or localization map obtained from the counting model may then be used by the feature extractor of the segmentation model to remove parts of the background from the respective image that is being processed.

It is, however, also possible to arrange the feature extractor of the segmentation model before (e.g., upstream of) the feature extractor of the counting model that is functioning as an attention generating mechanism.

Training the two models independently of each other has the advantage of an increased flexibility during training. For example, different computer systems may be used to train the two models as computation time or resources become available. The two models may even be trained at the same time or during overlapping periods of time. Also, the two models may be separately and independently checked or verified after respective training is complete. At least in principle, already known or existing counting and segmentation models may be used. This represents an especially easy and low-effort way to realize or implement the present embodiments.

In a further development of the present embodiments, at least the counting model is trained with synthetic images. In other words, at least some synthetic images are used to train the counting model or to train both the counting model and the segmentation model. Synthetic images are images that are manually or automatically created or adapted in accordance with predetermined rules and/or in such a way so as to have one or more predetermined characteristics, features, or properties. Using synthetic images for training the models, and the respective feature extractor, for example, may significantly reduce a time and effort required for obtaining a suitable set of training data (e.g., training images) and for providing that the training data (e.g., the synthetic training images) is balanced in terms of features or characteristics. This may provide that the images used to train the models do not lead to any unwanted biases of the feature extractors.

In one embodiment, the use of synthetic images as training images makes it possible to provide, with relatively low effort, that the training images obey the principle of compositionality and specifically of multiplicity (e.g., that the training images and corresponding features or characteristics correspond to the desired compositional class structure). The use of synthetic images for training the model or models does, however, not preclude the possibility to also use at least some natural images (e.g., images that have been taken by a camera and have not been specially adapted or edited for the training purpose).

In a further development of the present embodiments, the synthetic training images include images that are semantically similar to each other but are visually different from each other. Two images are semantically similar to each other in this sense when the two images depict the same number of objects of the predetermined type. Two images are visually different from each other in this sense when the two images differ in at least 50% of pixels. Two images may, for example, be visually different from each other when the two images depict different scenes in which the objects of the predetermined type are embedded. For example, the same number of objects of the predetermined type may simply be superimposed on top of or in front of different backgrounds or background scenes. It is, however, also possible that the objects of the predetermined type are surrounded by parts of the scene or background at different depth levels of the images. It may also be possible that, in terms of perceived or virtual depth of the respective image, the object or objects of the predetermined type may be considered to be located in a background of the image. Therefore, the terms 'background' and 'foreground' in the sense and context of the present application may not necessarily be strictly considered in terms of depth level or depth location of a particular part of the respective image. Rather, the object or objects of the predetermined type may be considered to be or represent the foreground of a respective image in a semantic sense independently from corresponding depth location or scenic depth in the respective image. Two images may also be visually different from each other if the two images depict the same background scene but a different foreground (e.g., different objects of the same predetermined type) and if the foreground (e.g., these objects) take up a significant part of the respective images (e.g., at least 50%).

Semantic similarity of two images provides that at a semantic level, there is a similarity among the two images. For example, two images that have different backgrounds or depict different scenes in which the foreground object or objects of the predetermined type are embedded may show or depict the same number of objects of the predetermined type. These two images would then be considered to be semantically similar or identical but visually different.

The semantic similarity or dissimilarity may also be a gradual measure, where the semantic similarity is lower if a difference between the numbers of objects of the predetermined type depicted in the two images is greater.

By introducing semantically similar but visually different images (e.g., training images that are visually different but correspond to the same class) for or in the training phase of at least the counting model for a corresponding feature extractor, the respective model neural net needs to work hard to find meaningful features to predict correct classes for the semantically similar or identical images.

In a further development of the present embodiments, the synthetic training images include images that are semantically different from each other but are visually similar to each other. Two images are semantically different from each other in this sense when the two images depict different numbers of objects of the predetermined type or, in other words, if the two images have different foregrounds. Two images are visually similar to each other in this sense when at least 50% (e.g., at least 70%) of pixels are identical. For example, two images may be visually similar to each other if the two images depict the same scene or background in which the objects of the predetermined type are embedded or on top of which or in front of which the objects of the predetermined type are superimposed. Visually similar images include images, where the same scene (e.g., the same background) is augmented or combined with different numbers or instances of the object or objects of the predetermined type. Having the same background is, however, not strictly necessary for two images to be visually similar to each other, for example, if the background only makes up a relatively small portion of the images (e.g., less than 50% or less than 70%). More generally, this provides that for two visually similar images, there is a similarity or identity at the pixel-level values across significant parts of the two images (e.g., for at least 50% or at least 70% of areas or pixels). This still leaves the possibility open that the two images are semantically different from each other (e.g., correspond to different classes). Starting from a particular image, it is, for example, possible to create a second image that is semantically different but visually similar to the starting image by augmenting the starting image with another instance of an object of the predetermined type (e.g., by artificially or synthetically adding one or more objects of the predetermined type to the starting image without changing the remaining parts, such as the background of the starting image to keep visual similarity intact).

By introducing semantically different but visually similar training images across different classes, the respective model (e.g., the respective feature extractor) learns to focus on the objects of the predetermined type (e.g., learns meaningful features about the object and learns to generalize well to images not seen or processed during the training or training phase, such as not seen as part of the training images).

In a further development of the present embodiments, the synthetic training images include images that are semantically similar to each other and are also visually similar but not identical to each other. For example, the two images may differ from each other through different locations, scales, and/or occlusions of one or more objects of the predetermined type. Two images are semantically similar to each other in this sense when the two images depict the same number of objects of the predetermined type. Two images are visually similar to each other in this sense when at least 50% or least 70% of pixels are the same. As explained, this may, for example, provide that the two images depict the same scene or background in which the objects of the predetermined type are embedded or on top of which or in front of which the objects of the predetermined type are superimposed. Two images may also be semantically and visually similar to each other while not being identical to each other if, for example, in one image, there is an additional object present that partly occludes one of the objects of the predetermined type. In other words, visually similar images of the same class are introduced during training. By introducing these types of images, the respective neural net or a feature extractor may learn factors of invariance.

The use of synthetic images for training is particularly advantageous since with relatively low effort, the various types of different images in terms of semantic and visual similarity and/or dissimilarity may be composed from a limited number of scenes or backgrounds, and objects of the predetermined type in different numbers and/or at different locations within the images. This may not be possible or as easy with live or real-world data or images, since it may not be possible to capture exactly the same scene at different instances of time or with the same object at different locations. Thus, by using synthetic images, it becomes possible to enforce different variants of visual and/or semantic similarity and/or dissimilarity in the synthetic training images as needed for optimal training and performance of the respective neural net or feature extractor. In other words, the possibility of using the synthetic images for training, such that the compositionality and multiplicity or dependency among the classes, the training images, and correspondingly of the classifier or classification layer of the counting model, respectively, may be controlled, is a particular advantage of the present embodiments.

Compositionality or multiplicity in synthetic training images may be created through additive as well as through subtractive techniques. In additive techniques, synthetic images may be composed from elements of natural images and/or, for example, manually or procedurally created elements like different backgrounds and foreground objects. The multiplicity is then created by adding more foreground objects of the predetermined type. In subtractive techniques, instances of objects (e.g., individual objects) of the predetermined type may be removed from existing images if pixel-level maps of the image are available. For removing instances of the object from an image, techniques like inpainting or other generative techniques may be used. In this case, while it is true that pixel-level labels may be used to augment or create the synthetic training images, these pixel-level labels or annotations are not actually used during the training of the neural net. The actual training of the neural net is done using the synthetic images with image-level annotations and may therefore still be considered to be weakly supervised. Overall, these techniques enable the use of synthetic images and the use of the large number of datasets and annotations that are already publicly available today.

In a further development of the present embodiments, one or more skip connections are added to the segmentation model and/or the deep neural net. Each skip connection connects a respective lower convolutional layer to a respective higher convolutional layer in a respective hierarchy of layers to provide data from the lower convolutional layer to the higher convolutional layer. A higher convolutional layer in this sense is a layer that is arranged further downstream as seen in a direction from an input layer to an output layer. In other words, a lower convolutional layer (e.g., a layer that is positioned or located lower in the hierarchy of layers) is located or arranged more closely to a respective input layer than is a higher layer. It has been found that bringing in details from one or more layers that are not directly adjacent may result in improved quality or accuracy of the generated map.

Another aspect of the present embodiments is a method for localizing any object of a predetermined type in an input image. In this method, a deep neural net is provided. This deep neural net combines parts and/or features of a discriminative deep counting model with parts and/or features of a deep segmentation model. Therein, the counting model is trained to classify images according to a number of objects of the predetermined type depicted in each of the images. The segmentation model is trained to segment images by classifying each pixel of a respective image according to what depicted object or part of the image the respective pixel belongs to. The counting model is trained for or with at least two (e.g., at least three or more) different classes corresponding to different numbers of objects of the predetermined type. In one embodiment, the counting model or the classes have a compositional class structure. In another act of this method, the input image is provided as an input to the deep neural net. Another act of this method includes capturing or acquiring a map generated by the deep neural net as an output for the input image. In one embodiment, the map is generated in a single forward pass of the respective input image through the deep neural net. In the generated map, any objects of the predetermined type depicted in the input image are indicated in the map.

The deep neural net provided herein may, in other words, be generated or created using a method according to the present embodiments for generating a deep neural net for localizing objects of a predetermined type in an input image. The map generated by the deep neural net may be a segmentation map or an attention map or localization map. Objects of the predetermined type may be localized through segmentation or indicated in the localization or attention map as areas of relatively highest attention or importance.

The methods according to the present embodiments described herein may fully or partially be computer-implemented methods.

Another aspect of the present embodiments is a deep neural net for localizing objects of a predetermined type in an input image, where the deep neural net according to the present embodiments is generated by a method for generating a deep neural net for localizing objects of the predetermined type in an input image according to the present embodiments.

In a development of the present embodiments, the deep neural net is structured to process each input image and generate the corresponding map in a single forward pass of the respective input image through the deep neural net. This may reduce processing time and requirements in terms of computational power.

Another aspect of the present embodiments is a computer program product or computer program including instructions that, when the computer program is executed by a computer, cause the computer to carry out at least one embodiment of a method according to the present embodiments. The computer program product according to the present embodiments does, in other words, represent or encode the acts of the respective method or methods. The computer used for executing the computer program product or computer program may, for example, include a processor, a microchip, or a microcontroller, and a computer-readable storage medium (e.g., a non-transitory computer-readable storage medium) that is connected thereto and contains the computer program product or computer program according to the present embodiments.

Such a computer-readable storage medium having stored thereon a computer program product or computer program according to the present embodiments is in itself another aspect of the present embodiments.

Another aspect of the present embodiments is a data carrier signal carrying a computer program product or computer program according to the present embodiments and/or a deep neural net generated according to the present embodiments.

The embodiments and developments of the present embodiments described herein for at least one aspect of the present embodiments (e.g., for the methods, the deep neural net, the computer program product, and the computer-readable storage medium), as well as the corresponding advantages may be applied to any and all aspects of the present embodiments.

BRIEF DESCRIPTION OF THE DRAWINGS

Further advantages, features, and details of the present embodiments derive from the following description of exemplary embodiments, as well as from the drawings. The features and feature combinations previously mentioned in the description, as well as the features and feature combinations mentioned in the following description of the figures and/or shown in the figures alone may be employed not only in the respectively indicated combination but also in other combinations or taken alone without leaving the scope of the present invention.

DETAILED DESCRIPTION

Matching or functionally equivalent features in the figures are indicated by the same reference signs.

The examples described below refer to embodiments. Therein, individual components and process acts of the embodiments each constitute individual, independent features of the present embodiments that may further develop the present embodiments independently of each other as well as in combinations not explicitly described. The described embodiments may be further developed or supplemented by features, components, and/or acts already described above.

Image processing is used in a wide variety of technical applications. One particular problem is localization of objects of specific kinds or types in images (e.g., in computer vision applications for image and video analytics).

Figure 1:
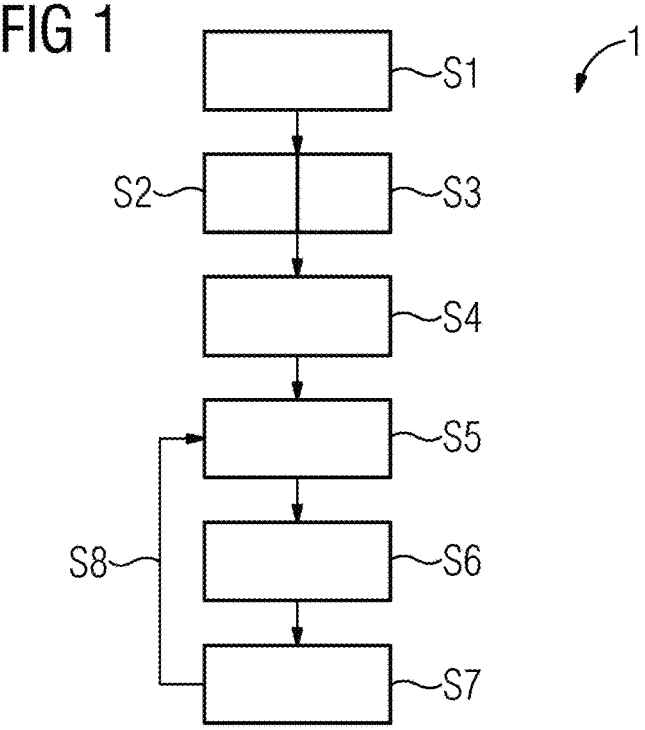
FIG. 1 schematically shows an example of a flow chart for a method for localizing objects in images.

FIG. 1 schematically shows an example of a flow chart 1 for a method for localizing objects in images 2. Below, acts of this method are shortly described. After that, further details and examples are given and described with reference to the other figures.

In a process act S1, training images 2 that may be used for training of a neural net (e.g., a model or deep model) are generated or selected, so that the neural net may be used for the task of processing the images 2 to localize objects of a predetermined type depicted therein.

In process acts S2 and S3, a discriminative deep counting model and a deep segmentation model are trained using the training images generated and/or selected in process act S1, and the neural net for localizing the objects of the predetermined type is formed by combining parts and/or features of the counting model and the segmentation model. The process acts S2 and S3 may be performed in different orders, which is illustrated by the parallel arrangement of the process acts S2 and S3 in FIG. 1. The counting model is trained to classify images 2 according to a number of objects of the predetermined type depicted in each of the images 2, where the counting model has a compositional class structure and is trained for at least three different classes corresponding to different numbers of objects of the predetermined type. The segmentation model is trained to segment images 2 by classifying each pixel of the respective image 2 according to or depending on what depicted object or part of the image 2 the respective pixel belongs to. The neural net that is generated by training the counting model and the segmentation model and combining these models or parts or features thereof is adapted to generate a map indicating locations of any objects of the predetermined type for each processed image 2 in a single forward pass of the respective image 2 through the neural net.

To complete the neural net, in a process act S4, an upsampling stage or upsampling module 15 is added to the neural net.

After the neural net is completed (e.g., after the neural net is trained and assembled or prepared for an inference phase), an image 2 to be processed is provided as an input to the neural net in a process act S5. This as well as the following processing acts is also referred to as an inference phase.

In a process act S6, the image 2 is then processed by the neural net, generates the corresponding map.

In a process act S7, the generated map is captured or acquired as a processing result. This may, for example, provide that the generated map is saved or stored on an electronic or computer-readable storage medium and/or transmitted to another program or application for further processing or usage.

If multiple images, such as a series of images or a video stream, is to be processed, a respective next image is then provided as an input to the neural net in a process act S8 to also be processed. This is indicated by a loop formed by the process acts S5 to S8 in FIG. 1.

Figure 2:
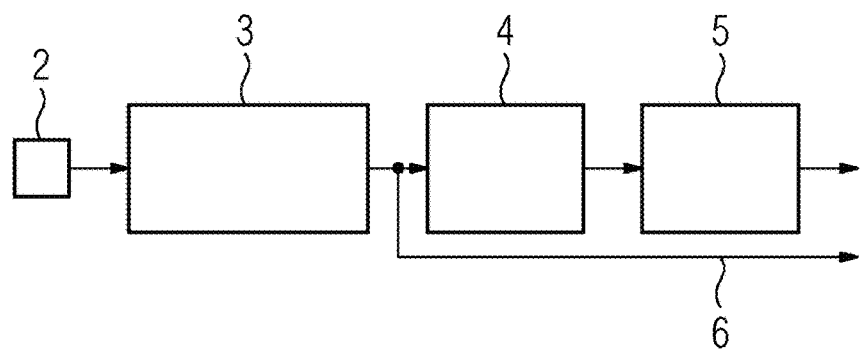
FIG. 2 shows a schematic illustration of one embodiment of a deep counting net usable for object localization.

FIG. 2 schematically shows a basic structure of a discriminative deep neural net that may be used as a deep counting model. Here, an image 2 may be provided as an input to a feature extractor made up of or including multiple convolutional layers 3. During a training phase, the image 2 may be an annotated training image, while during an inference phase after the training is completed, the image 2 may be a test image (e.g., an image to be processed that has not necessarily been seen or encountered by the counting model during training). The convolutional layers 3 are followed by one or more fully connected layers 4 and a counting classification layer or counting classifier 5, which may also be a fully connected layer. The counting classifier 5 contains multiple output nodes representing various count categories (e.g., various numbers of objects of the predetermined type).

During the training phase, the image 2 is processed through the convolutional layers 3, the fully connected layers 4, and the counting classifier 5.

By training the counting model using synthetic training images where these training images of different count categories or classes obey the principles of 'Compositionality' and specifically 'multiplicity', the feature extractor (e.g., the group of convolutional layers 3), the deep counting model learns to focus attention on the objects being counted.

After the training phase is completed, the image 2 may be processed through or by the convolutional layers 3. As an output 6 of a last or hierarchically highest of the convolutional layers 3, a localization map or attention map indicating areas of the image 2 corresponding to any objects of the predetermined type depicted therein may be captured or acquired.

Figure 3:
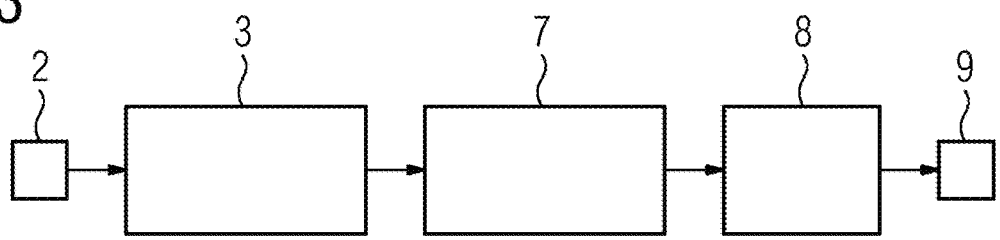
FIG. 3 shows a schematic illustration of one embodiment of a segmentation net for generating a segmentation map of an image.

FIG. 3 schematically shows a typical basic structure of a deep neural network that may be used as a segmentation network or segmentation model. As is the case for the counting model here also, the image 2 may be provided as an input to a group or series of convolutional layers 3. The convolutional layers 3 are followed downstream by one or more deconvolutional layers 7 that are also known as transposed convolutional layers. An output layer of the segmentation model is formed by a segmentation classifier 8. The segmentation classifier 8 may classify each pixel of the image 2 as belonging to a foreground or a background of the image 2. After training of the segmentation model is completed, the segmentation model may predict a segmentation map 9 of or for a processed image 2 at or almost at the resolution of the respective processed image 2. While FIG. 3 shows a typical architecture of a segmentation network, other architectures may be possible.

Figure 4:
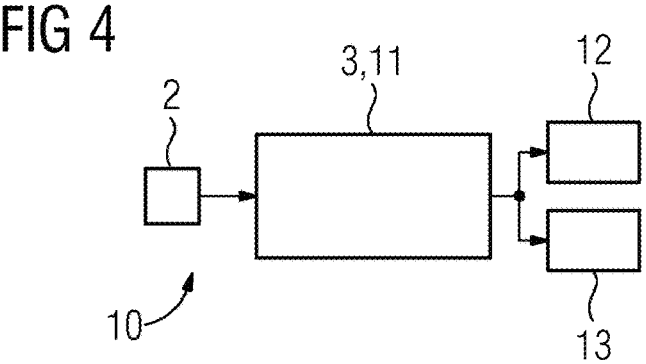
FIG. 4 shows a schematic illustration of an exemplary combination of a counting model and a segmentation model for a training phase.

FIG. 4 schematically illustrates the basic idea of combining the counting model and the segmentation model into a deep neural net 10 to leverage the individual strengths and benefits of the counting model as well as the segmentation model to improve a quality or accuracy of the object localization and/or image segmentation. A shared or common feature extractor 11, for example, forms an input stage of the deep neural net 10. The common feature extractor 11 is followed downstream by a counting head or a counting model head 12 and a segmentation head or segmentation model head 13. The counting model head 12 and the segmentation model head 13 are arranged parallel to each other. While the common feature extractor 11 includes multiple convolutional layers 3, the counting model head 12 includes one or more fully connected layers, and the segmentation model head 13 includes one or more convolutional layers. Another way to look at the structure shown in FIG. 4 is that the feature extractor of the deep counting model is leveraged and augmented with the segmentation model head 13 that classifies pixels as belonging to the category of foreground object or background during the training phase.

During the training phase using the structure shown in FIG. 4, a counting loss function $L_{CNT}$ may be used for training the counting model head 12, and a segmentation loss function $L_{SEG}$ may be used for training the segmentation model head 13. A combined training loss function L for the complete structure (e.g., for the deep neural net 10) may then be expressed as $L=\alpha \cdot L_{CNT}+\beta \cdot L_{SEG}$ with $\alpha$ and $\beta$ being tuneable weighting factors or weights for the counting branch and the segmentation branch, respectively. The overall loss function L is a weighted combination of the counting loss function $L_{CNT}$ and the segmentation loss function $L_{SEG}$. By adjusting the weighting factors $\alpha$ and $\beta$, the impact of the counting part and the segmentation part may be varied to tune the deep neural net 10. For example, it is possible to dynamically change the weights $\alpha$ and $\beta$ of the two components of the combined loss function L during training (e.g., based on known or available information about the respective training image to be processed and/or about a use case or application for which the deep neural net is intended). While, at training time, the counting loss function $L_{CNT}$ helps to eliminate an image background or background scene effectively, the segmentation loss function $L_{SEG}$ helps to obtain a more accurate and fuller segmentation of the foreground object or objects of the predetermined type.

Figure 5:
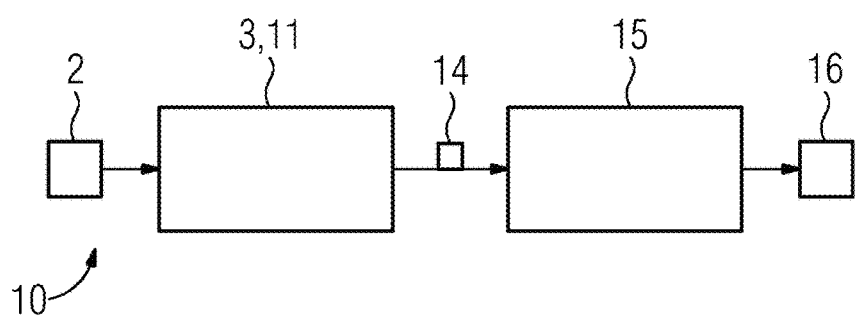
FIG. 5 shows a schematic illustration of one embodiment of a multi-task-trained deep neural net for in inference phase.

During or for the inference phase, it is possible to only use the convolutional layers 3 (e.g., the common feature extractor 11 may be used for processing the image 2 to obtain localized regions for the object or object of the predetermined type or to segment the image 2). This is schematically shown in FIG. 5. The image 2 is provided as an input to the common feature extractor 11, which may be considered to be a deep neural net 10, since the common feature extractor 11 includes multiple convolutional layers 3. By processing the input image 2, the common feature extractor 11 generates, as an output, a downsampled segmentation map 14 that typically has a smaller size (e.g., a lower resolution) than the input image 2. The downsampled segmentation map 14 may then be fed as an input to the upsampling stage or upsampling module 15.

The upsampling module 15 generates, as an output, an upsampled segmentation map 16 that has a higher resolution than the downsampled segmentation map 14. The upsampled segmentation map 16 may have the same or almost the same resolution as the respective image 2.

Figure 6:
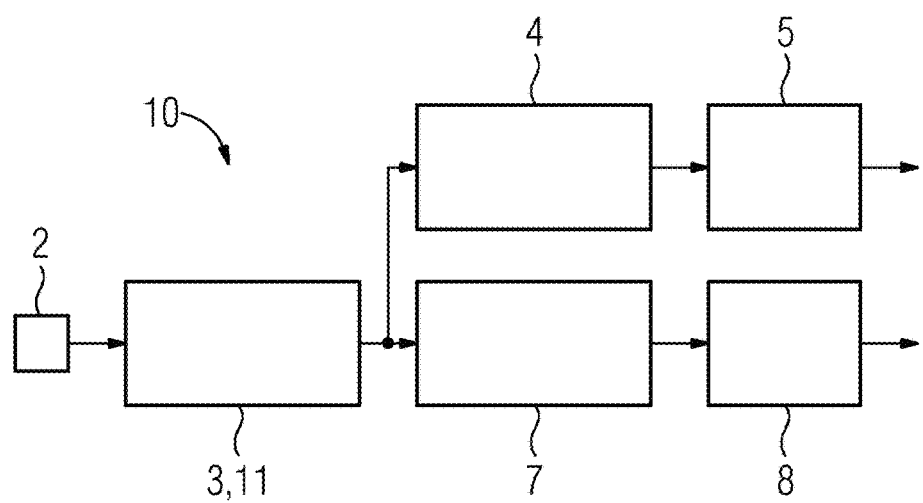
FIG. 6 shows a schematic illustration of a first example of a multi-task deep neural net.

FIG. 6 shows a schematic illustration of a first example of a multi-task deep neural net 10 (e.g., one option of how to combine the counting model and the segmentation model into the deep neural net 10). In one embodiment, two branches go out from an output side of the convolutional layers 3 (e.g., the common feature extractor 11). A first branch corresponding to the counting model includes the fully connected layers 4 and the counting classifier 5. The second branch corresponding to the segmentation model includes the deconvolutional layers 7 and the segmentation classifier 8. Basically, the two branches correspond to the counting model and the segmentation model shown in FIG. 2 and FIG. 3, respectively. This approach, however, would provide that an increased number of layers for the segmentation model would be trained since the segmentation model includes the series of unpooling and deconvolutional layers 7. During the inference phase, these additional layers would also be used, resulting in increased processing time or computational requirements.

Figure 7:
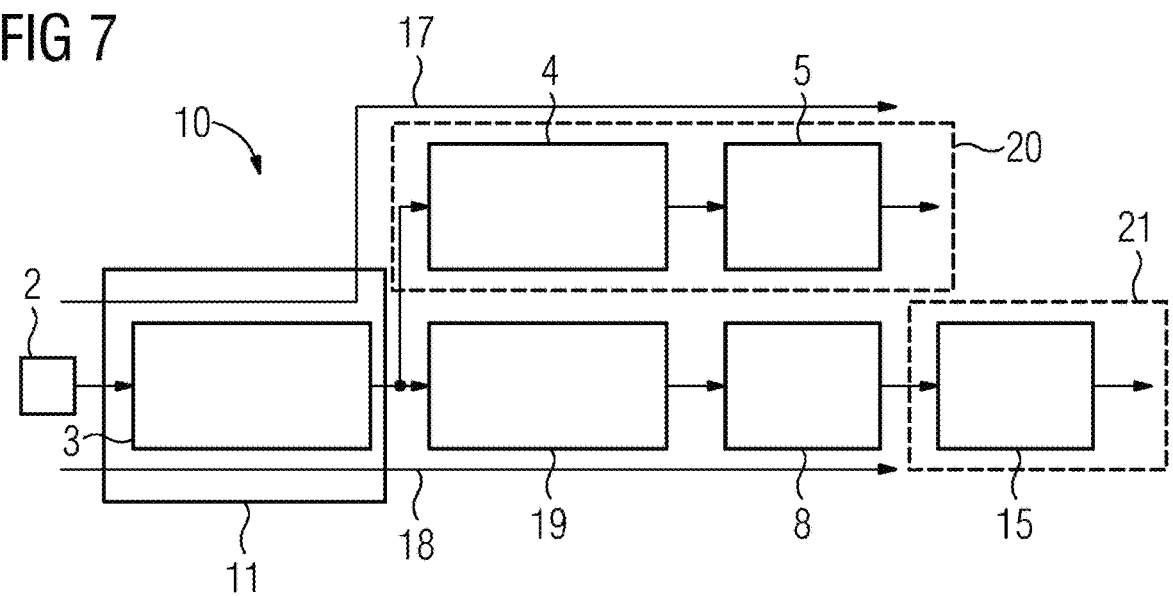
FIG. 7 shows a schematic illustration of a second example of a multi-task deep neural net.

FIG. 7 shows a schematic illustration of a second example of a multi-task deep neural net 10. This represents a more efficient approach of combining the deep counting model and the deep segmentation model. Here, also, the common feature extractor 11 includes multiple convolutional layers 3. Similar to the structure shown in FIG. 6, two branches go out from a last or hierarchically highest of the convolutional layers 3 (e.g., after the common feature extractor 11).

Following a first data path 17, data to be processed (e.g., the input image 2 or data derived therefrom) flows through the common feature extractor 11 along the first branch to the fully connected layers 4 and the counting classifier 5. As before, the fully connected layers 4 and the counting classifier 5 correspond to the deep counting model or counting part of the deep neural net 10 during the training phase. Following a second data path 18, the data flows through the common feature extractor 11 to augmented convolutional layers 19 and on to the segmentation classifier 8. The augmented convolutional layers 19 and the segmentation classifier 8 correspond to the segmentation model or segmentation part of the deep neural net 10.

After the deep neural net 10 has been fully trained, the fully connected layers 4 and the counting classifier 5 may be removed for the inference phase. This is illustrated by, for example, a dashed first box 20. At the same time, the upsampling module 15 that is not necessarily present during the training phase may be added after the segmentation classifier 8 for the inference phase. This is illustrated by a dashed second box 21.

In this approach, the segmentation model or segmentation part does not include a full-fledged decoder or full stack of deconvolutional and unpooling layers, such as the deconvolution layers 7 shown, for example, in FIG. 6. Instead, the common feature extractor 11 of the deep counting model and the deep segmentation model is augmented with one or a few convolutional layers (e.g., the augmented convolutional layers 19) and made to predict a downsampled segmentation map 14. The rationale for this simplification is that an output of the feature extractor of the counting model or, in this case, the common feature extractor 11 trained as part of or in connection with the counting part of the deep neural net 10 has already learned to generate an almost good downsampled localization map. This localization map only needs to be pulled up slightly to obtain a good downsampled segmentation map. This is done by processing the downsampled localization map 14 through the augmented convolutional layers 19 and the segmentation classifier 8 to obtain an improved downsampled segmentation map with improved localization or segmentation quality or accuracy as compared to segmentation maps typically generated by traditional segmentation networks. This simplification would not have been possible without the property of the feature extractor of the individual deep counting model to have good object localization properties.

The upsampling module 15 may then generate an upsampled segmentation map 16 with improved resolution from the improved downsampled segmentation map.

Figure 8:
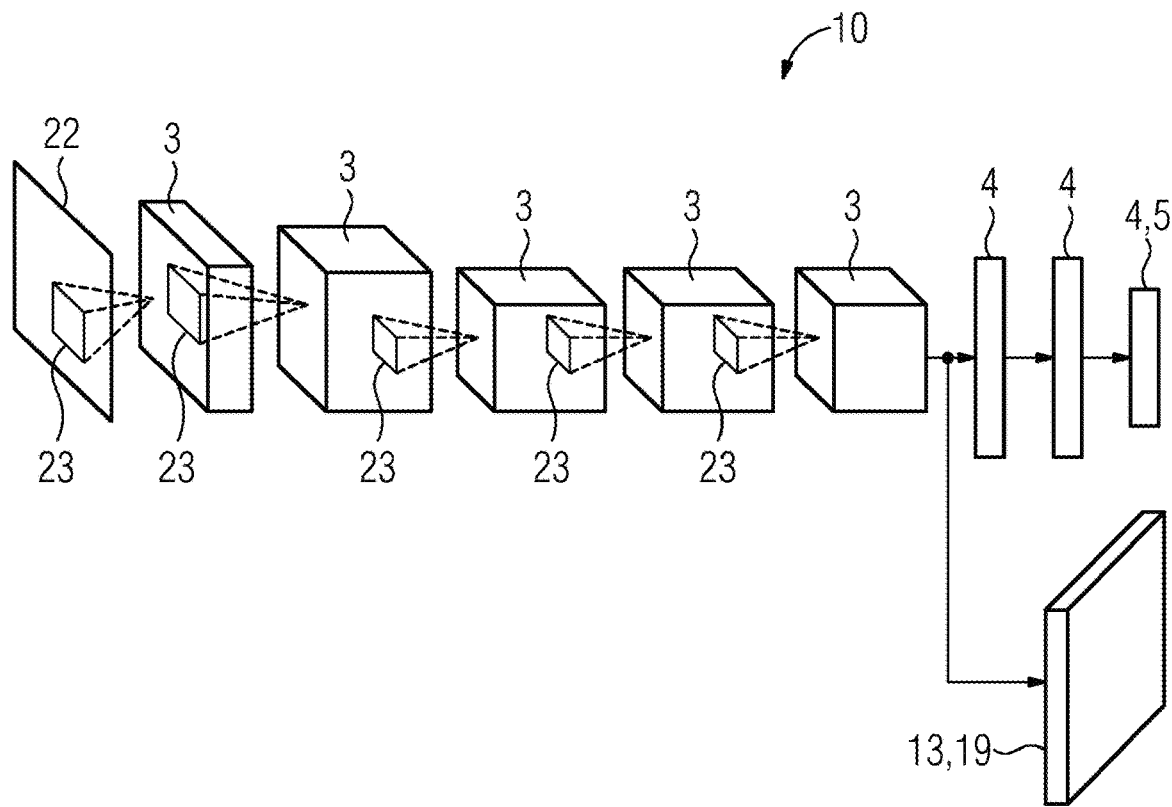
FIG. 8 shows a schematic overview of one embodiment of a structure of a deep neural net.

The basic ideas described herein may, in principle, be implemented with any deep convolutional neural network. As an example, FIG. 8 schematically shows a more detailed structure of a deep neural net 10 based on the backbone network of AlexNet. In this example, the deep neural net 10 includes an input layer 22 followed by five convolutional layers 3. The convolutional layers 3 form the feature extractor of the deep neural net 10 shown in FIG. 8. In a first branch, the convolutional layers 3 are followed by three fully connected layers 4 including the counting classifier 5. In a second branch, also going out after the fifth and final of the convolutional layers 3, an additional convolutional layer corresponding to the segmentation model head 13 or the augmented convolutional layer 19 is added. This additional convolutional layer may be adapted to generate a segmentation map equal to the size of an individual feature map of the fifth convolutional layer 3. The additional convolutional layer added in the second branch may have a size or dimension of 1×1.

Each output of the additional convolutional layer is driven by a cross entropy loss function where the output categories or classes correspond to two levels corresponding to a foreground and a background, respectively. It is also possible, albeit not explicitly shown in FIG. 8, to add one or more skip connections to bring in details from one or more of the other layers 22, 3 of the deep neural net 10.

To further illustrate the structure of the deep neural net 10, kernels 23 of the input layer 22 and the convolutional layers 3 are also indicated in FIG. 8. The layers 22, 3, 4, 5, 19 of the deep neural net 10 are represented or shown in different ways to indicate that the layers 22, 3, 4, 5, 19 may have different sizes or dimensions in terms of numbers of neurons in each layer. Similarly, it is possible for the kernels 23 to have different sizes or dimensions.

To enable the counting model to focus on and localize objects of the predetermined type, the training images used for training are specifically generated and/or selected for this purpose (e.g., with compositionality in mind). Multiplicity is a specific form of compositionality. Other forms of compositionality may be achieved in different ways; for example, a form of compositionality may be achieved through different occlusion patterns between two objects.

For the present examples, people or persons 30 are used as the objects of the predetermined type.

Figure 9:
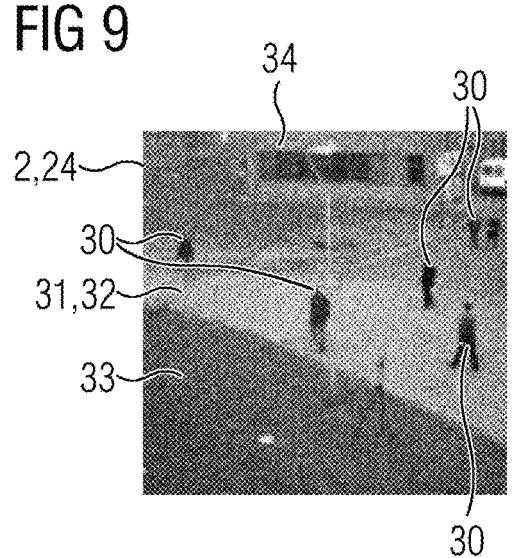
FIG. 9 shows an exemplary image that depicts a scene with multiple people.
Figure 10:
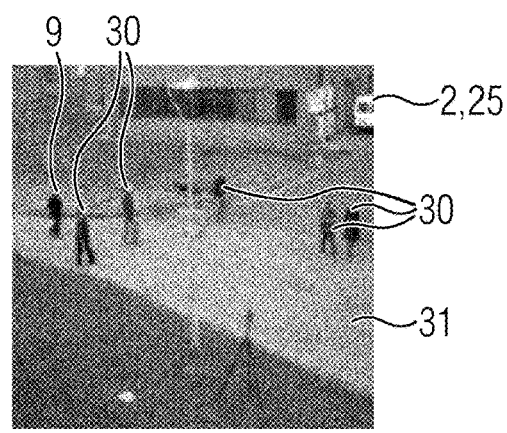
FIG. 10 shows an exemplary image that is semantically and visually similar to the image of FIG. 9.

FIG. 9 and FIG. 10 show a first training image 24 and a second training image 25, respectively. The first training image 24 and the second training image 25 are semantically similar and visually similar to each other. This provides that the first and second training images 24, 25 contain the same number of objects of the predetermined type, which, in this case, are, for example, the persons 30. Additionally, the first and second training images 24, 25 contain the same first background 31 (e.g., the same scene in which the persons 30 are embedded). In the present example, the first background 31 includes a street 32, a lawn 33, and a building 34, as well as any other parts of the first and second training images 24, 25 that are not persons 30. Providing training images that are semantically similar as well as visually similar to each other helps the deep neural net 10 to learn or capture invariances in the training images 24, 25 of the same class (e.g., with the same number of persons 30).

Figure 11:
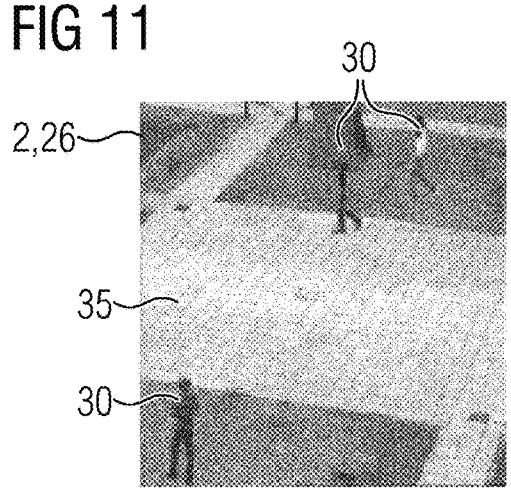
FIG. 11 shows another exemplary image that depicts a different scene also with multiple people.
Figure 12:
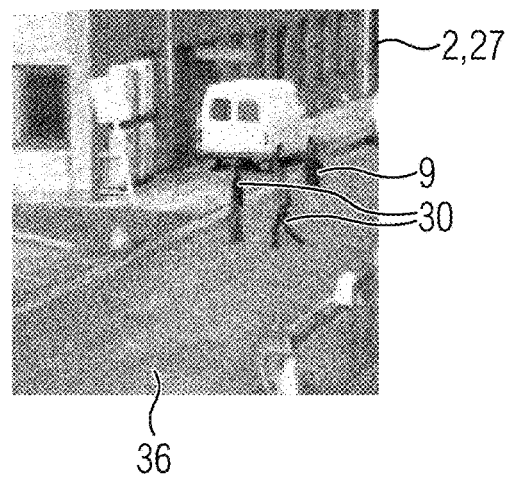
FIG. 12 shows an exemplary image that is semantically similar to but visually different than the image of FIG. 11.

FIG. 11 and FIG. 12 show a third training image 26 and a fourth training image 27, respectively. The third and fourth training images 26, 27 are semantically similar because the third and fourth training images 26, 27 both contain the same number of persons 30. The third and fourth training images 26, 27 are, however, visually different because the third training image 26 contains a second background 35, while the fourth training image 27 contains a third background 36 that is different from the second background 35. In short, the third and fourth training images 26, 27 are semantically similar images, since both have the same number or count of people or persons 30, but are visually different from each other, since the second and third backgrounds 35, 36 are different. Also, the foregrounds of the third and fourth training images 26, 27 include different persons 30, albeit the same number. This may be formalized as $I_1$=Background1*Foreground1, $I_2$=Background2*Foreground1, where I denotes an image, and the symbol '*' denotes a composition. "Foreground1'"' represents or includes the objects to be counted or localized, which in this example, are the persons 30.

Figure 13:
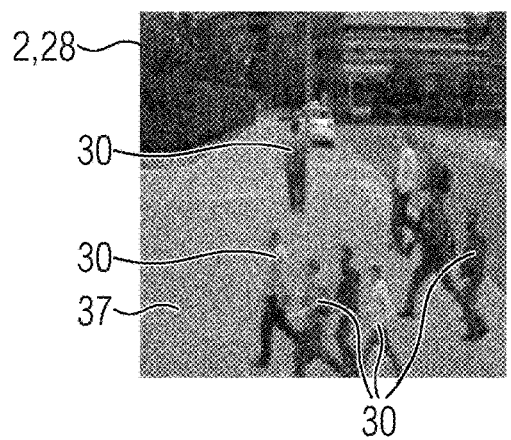
FIG. 13 shows another exemplary image depicting another scene with multiple people.
Figure 14:
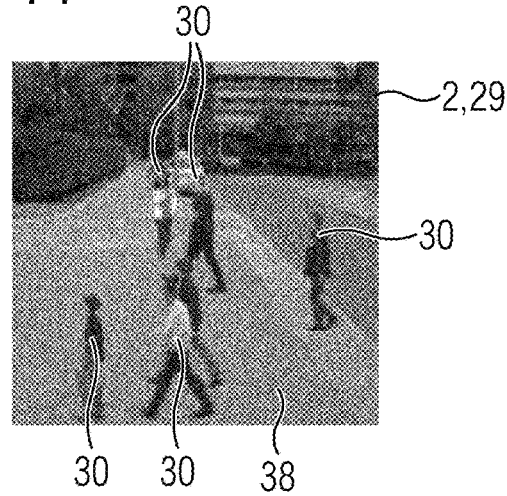
FIG. 14 shows an exemplary image that is semantically different from but visually similar to the image of FIG. 13.

FIG. 13 and FIG. 14 show a fifth training image 28 and a sixth training image 39, respectively. The fifth and sixth training images 28, 29 are semantically different from each other, since both depict different numbers of persons 30. The fifth and sixth training images 28, 29 are, however, visually similar to each other, since a fourth background 37 of the fifths training image 28 is the same as a fifth background 38 of the sixth training image 29. This may be formalized as $I_1$=Background*Foreground1, $I_2$=Background*Foreground1*Foreground2, where I denotes an image, and the symbol '*' denotes a composition. "Foreground1" and "Foreground2" represent or include the objects to be counted or localized, such as the people 23.

Since 'count' or 'number' as a feature is invariant to scale, the deep counting model may localize objects of the predetermined type at varying scales, at least if trained accordingly (e.g., with training images that show objects of the predetermined type at different sizes or scales). For example, these objects at different scales may be localized without any additional steps that are typically needed in other detection techniques. An example of the ability of a feature extractor trained for or with the counting model to localize objects at varying scales is illustrated in FIG. 12.

Figure 15:
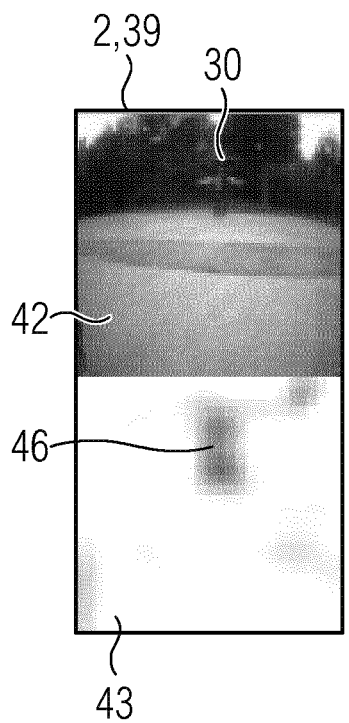
FIG. 15 shows another exemplary image depicting another scene with a person at a first scale, and a corresponding localization map.
Figure 16:
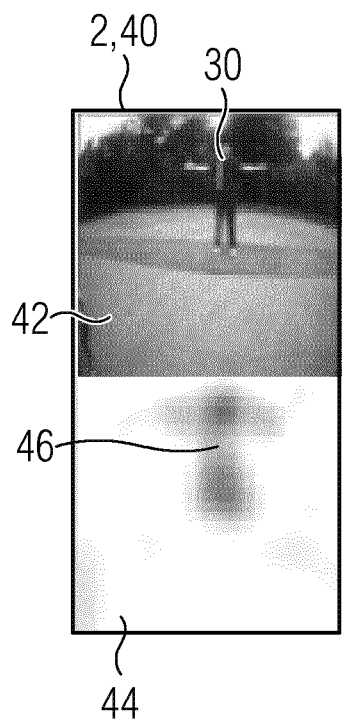
FIG. 16 shows essentially the image of FIG. 15 with the person shown at a second scale.
Figure 17:
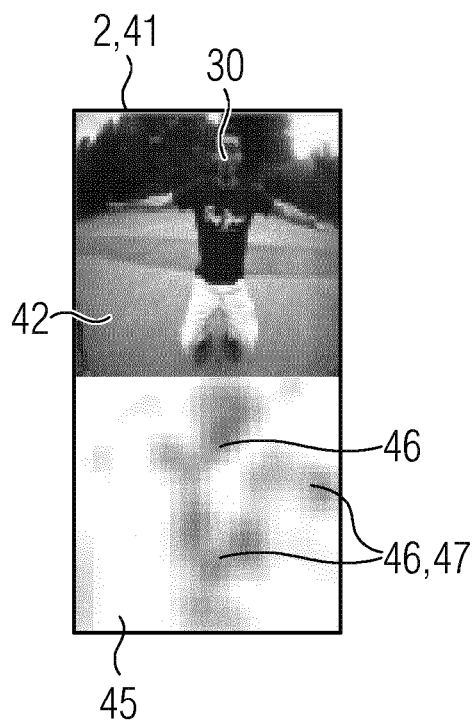
FIG. 17 shows essentially the image of FIG. 15 and FIG. 16 with the person shown at a third scale.

FIG. 15, FIG. 16, and FIG. 17 show a sequence of three test images (e.g., a first test image 39 in FIG. 15, a second test image 40 in FIG. 16, and a third test image 41 FIG. 16). All three of the test images 39, 40, 41 have the same sixth background 42, and all three of the test images 39, 40, 41 depict exactly one person 30 each. This person 30 is, however, shown at varying distances from a camera used to capture the test images 40, 41, 42. In the first test image 39, the person 30 is located at a distance of 6 m from the camera and occupies an area of approximately 50×66 pixels. In the second test image 41, the person 30 is located at a distance of 3 m from the camera and occupies an area of approximately 93×130 pixels. In the third test image 42, the person 30 is located at a distance of 0.8 m from the camera and occupies an area of approximately 256×280 pixels.

In addition to the test images 39, 40, 41, respective corresponding counting localization maps 43, 44, and 45 are shown in FIG. 15, FIG. 16, and FIG. 17, respectively. In the counting localization maps 43, 44, and 45, respective object areas 46 are indicated. The indicated object areas 45 correspond to areas or parts of the respective test image 39, 40, 41 that belong to the person 30, as found by the counting model. At all different scales, the counting model was able to successfully localize the respective person 30.

In FIG. 15, the first counting localization map 43 derived from the first test image 39 shows an object area 46 that clearly indicates the location of the person 30 in the first test image 39. Similarly, in FIG. 16 the location of the person 30 in the second test image 40 is correctly indicated in the corresponding second counting localization map 44. The object area 46 is noticeably larger than the object area 35 in the first counting localization map 41 corresponding to the larger site of the person 30 in the second test image 40. In FIG. 17, in the third counting localization map 45 derived from the third test image 42, the indicated object area or areas 46 are again significantly larger than the object areas 46 indicated in the first and second counting localization maps 43, 44. It is clearly visible that in the third localization map 45, additional object areas 47 corresponding to the person 30 are indicated when compared to the first and second counting localization maps 43, 44. These additional object areas 47 do, however, noticeably correspond to areas of the third test image 41 that are actually occupied by the person 30 and are therefore not false positive areas 62 (see FIG. 26).

Figure 18:
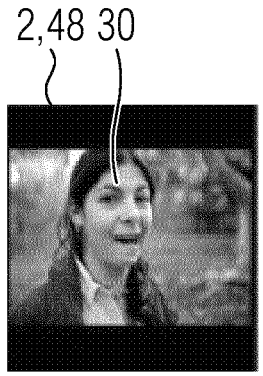
FIG. 18 shows another exemplary image depicting a person.
Figure 19:
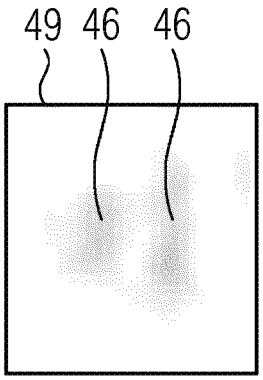
FIG. 19 shows an exemplary localization map corresponding to the image of FIG. 18 generated using only a deep counting model.
Figure 20:
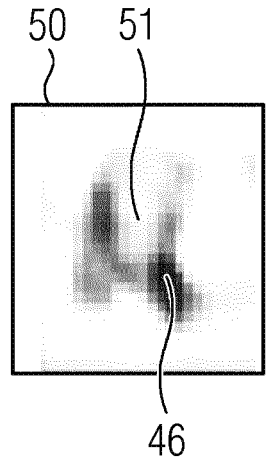
FIG. 20 shows an exemplary localization map corresponding to the image of FIG. 18 generated using only a deep segmentation model.
Figure 21:
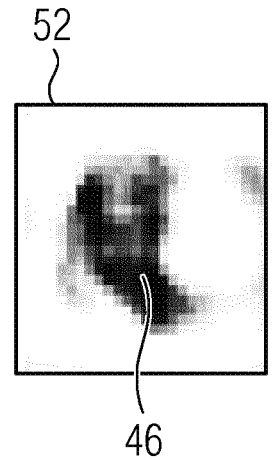
FIG. 21 shows an exemplary localization map corresponding to the image of FIG. 18 generated using combined model.

To illustrate the feasibility and advantages of the approach proposed herein of using a combination of deep counting and segmentation models, FIG. 18 shows a fourth test image 48. For the fourth test image 48, corresponding localization maps 49, 50, 52 generated using different models or approaches are shown in FIG. 19, FIG. 20, and FIG. 21. Again, the fourth test image 48 shows a single person 30 in front of a background. FIG. 19 shows a counting branch localization map 49 that has been obtained using only the deep counting branch (e.g., the deep counting model corresponding to the counting loss function $L_{CNT}$). In the counting branch localization map 49, some separated object areas 46 are weakly indicated. While these object areas 46 do roughly correspond to parts of the fourth test image 48 that belong to the person 30, it is clear that the separated object areas 46 indicated in the counting branch localization map 49 do not represent an accurate and complete localization of the person 30.

In FIG. 20, a segmentation branch localization map 50 is shown. The segmentation branch localization map 50 is obtained using only the deep segmentation branch (e.g., the segmentation model corresponding to the segmentation loss function $L_{SEG}$). In the segmentation branch localization map 50, the connected indicated object areas 46 are larger than in the counting branch localization map 49 and represent a more accurate or more complete localization of the person 30 in the fourth test image 48. There are, however, still some missed areas 51 in the segmentation branch localization map 50 that did not get indicated as belonging to or corresponding to the person 30 even though this is clearly the case in the fourth test image 48.

FIG. 21 shows a combination localization map 52 that has been obtained using the described combined approach (e.g., the combined deep neural net 10 corresponding to the combined loss function $L=\alpha \cdot L_{CNT}+\beta \cdot L_{SEG}$). The object areas 46 in the combination localization map 52 are again larger than in the counting branch and segmentation branch localization maps 49, 50, and represent an even more accurate and full localization of the person 30 in the fourth test image 48. For example, the missed areas 51 clearly visible in the segmentation branch localization map 50 are now properly indicated in the combined localization map 52 as belonging to the person 30. The examples of the different localization maps 49, 50, 52 obtained if only the counting model is used versus if only the segmentation part of the cost function L is used versus if the proposed combined method is used as shown in FIG. 19, FIG. 20, and FIG. 21, respectively, clearly demonstrate the superior performance of the proposed combined approach.

Figure 22:
FIG. 22 shows another exemplary image depicting a scene with multiple people.

As described above, the common feature extractor 11 may be trained in a combined manner for both the counting model and the segmentation model at essentially the same time. It is also possible to combine the counting model and the segmentation model at training and/or at inference time by sequencing the counting model and the segmentation model one after the other (e.g., the counting model followed by the segmentation model or vice versa). As examples for the improved performance of using the segmentation model after the segmentation model has been trained by cues (e.g., attention maps generated by the counting model), FIG. 22 and FIG. 25 show a fifth test image 53 and a sixth test image 59, respectively.

Figure 23:
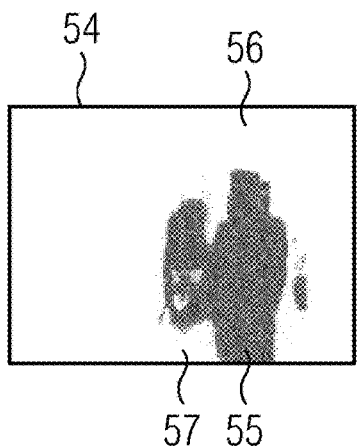
FIG. 23 shows an exemplary segmentation map corresponding to the image of FIG. 22 generated using only a segmentation model.
Figure 24:
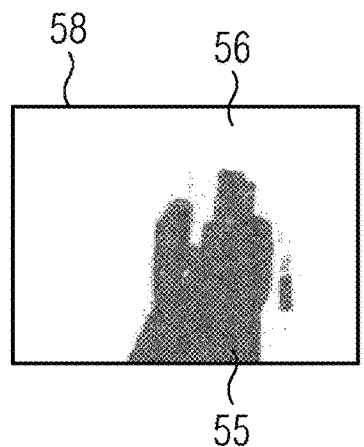
FIG. 24 shows an exemplary segmentation map corresponding to the image of FIG. 22 generated using a segmentation model trained by cues generated by a counting model.

The fifth test image 53 shows two persons 30 in front of a background. Corresponding to the fifth test image 53, FIG. 23 shows a first pure segmentation map 54 that has been obtained using only the independently trained segmentation model. While some object segments 55 corresponding to the persons 30 and some background segments 56 are essentially correctly indicated in the first pure segmentation 54, there are also some missed segments 57 that are incorrectly categorized or segmented as belonging to the background. FIG. 24 shows a first cued segmentation map 58 also corresponding to the fifth test image 53. The first cued segmentation map 58 has been obtained using the segmentation model after the segmentation model has been trained by cues generated by the counting model. In the first cued segmentation map 58, the indicated object segments 55 and background segments 56 clearly represent a more accurate and full localization of the persons 30 (e.g., a more accurate segmentation of the fifth test image 53). For example, the missed segments 57 that were incorrectly categorized in the first pure segmentation map 54 are in the first cued segmentation map 58 now correctly indicated as belonging to or corresponding to the persons 30. This example illustrates the potential of the combined approach described herein to increase correct or true detections of objects.

Figure 25:
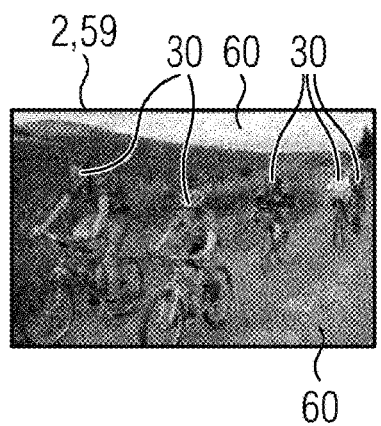
FIG. 25 shows another exemplary image depicting a scene with multiple people.
Figure 26:
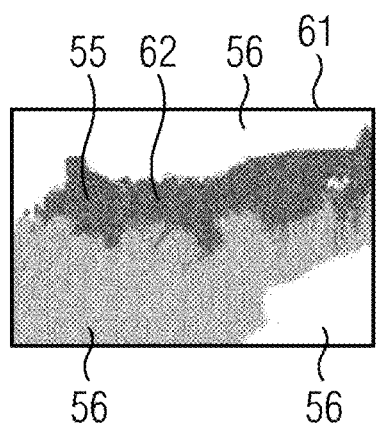
FIG. 26 shows an exemplary segmentation map corresponding to the image of FIG. 25 generated using only a segmentation model.

The sixth test image 59 shown in FIG. 25 shows multiple persons 30 riding bikes in front of a seventh background 60. The seventh background 60 includes areas of road, landscape, and sky. FIG. 26 shows a second pure segmentation map 61 corresponding to the sixth test image 59. The second pure segmentation map 61 has been obtained using only the independently trained segmentation model, similar to the first pure segmentation map 54. While some object segments 55 corresponding to the persons 30, and some background segments 56 corresponding to different parts of the seventh background 60 have been correctly indicated in the second pure segmentation maps 61, there are also some false positive segments 62 incorrectly indicated or segmented as belonging to the persons 30 even though in the sixth test image 59, the corresponding areas clearly are part of the seventh background 60.

Figure 27:
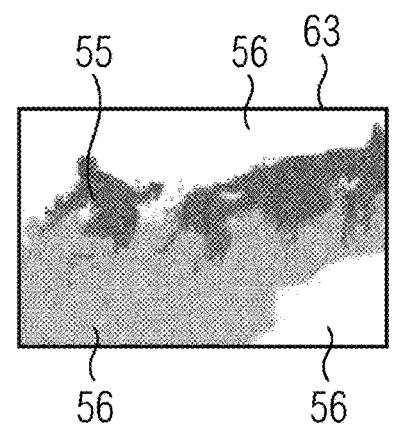
FIG. 27 shows an exemplary segmentation map corresponding to the image of FIG. 25 generated using a segmentation model trained by cues generated by a counting model.

FIG. 27 shows a second cued segmentation map 63 also corresponding to (e.g., derived from) the sixth test image 59. The second cued segmentation map 63 has been obtained using the segmentation model after the segmentation model has been trained by cues generated by the counting model, similar to the first cued segmentation map 58. In the second cued segmentation map 63, the outlines or shapes of the object segments 55 now more closely and accurately match the actual outlines or shapes of the persons 30 in the sixth test image 59 when compared to the second pure segmentation map 61. Notably, the false positive segments 62 that had been incorrectly classified in the second pure segmentation map 61 are now correctly classified or indicated as background segments 56 in the second cued segmentation map 63. This example illustrates the ability of the described combined approach to reduce false detections.

To summarize, a deep model for counting and a deep model for segmentation may be combined to generate or obtain a deep neural net 10 that exhibits superior performance in localizing objects or segmenting images 2 when compared to either the deep counting model or the deep segmentation model on their own. The two components $L_{CNT}$ and $L_{SEG}$ of the combined loss function L corresponding to the counting and segmentation models or parts, respectively, aid the common feature extractor 11 in the combined architecture in learning features more desirable for object localization and/or image segmentation. Thus, the benefits of both the deep model for counting and the deep model for segmentation may be obtained and combined. The feature extractor of the counting model being a discriminative model tends to focus only on specific features of the object being counted (e.g., focuses on the most discriminative features that the model learns). By adding a segmentation layer, such as the augmented convolutional layers 19 or the segmentation model head 13, the feature extractor is driven by the segmentation cost or segmentation loss function $L_{SEG}$ together with the counting cost or counting loss function $L_{CNT}$ in a multi-task framework. The feature extractor learns to focus on more complete regions of the object as compared to using only a single counting model. The counting model facilitates the detection of small and/or partially occluded objects. If only the segmentation loss function $L_{SEG}$ is used without the counting model, the background elimination is much poorer, and a much worse accuracy is achieved than if the counting loss function $L_{CNT}$ is used in a multi-task framework. The segmentation part provides or facilitates fuller detection across scales.

Overall, the described examples illustrate how automated object localization in images may be achieved with improved performance over the currently available state-of-the-art.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating a deep neural net for localizing objects of a predetermined type in an input image, the method comprising:
    training a discriminative deep counting model to classify images according to a number of objects of the predetermined type depicted in each of the images, wherein the discriminative deep counting model is trained for at least two different classes corresponding to different numbers of objects of the predetermined type;
    training a deep segmentation model to segment images, the training of the deep segmentation model comprising classifying each pixel of a respective image according to what part of the respective image the respective pixel belongs to;
    forming the deep neural net, the forming of the deep neural net comprising combining parts of the discriminative deep counting model and the segmentation model to form the deep neural net, wherein the deep neural net is structured, such that by processing the respective input image, a respective corresponding map indicating locations of any objects of the predetermined type for each processed input image is generated; and
    adding an upsampling module after a final convolutional layer of the deep neural net, wherein the upsampling module comprises an image processing algorithm based neither on machine learning nor on a neural net architecture, wherein the upsampling module is configured to take the generated map as an input and to generate, from the generated map, an upsampled map,
    wherein the discriminative deep counting model and the deep segmentation model are trained in combination with each other, the training comprising:
        arranging a counting model head and a segmentation model head in parallel with each other downstream of a shared feature extractor for the discriminative deep counting model and the deep segmentation model, wherein the counting model head comprises at least one fully connected layer, the segmentation model head comprises at least one transposed convolutional layer, at least one convolutional layer, or the at least one transposed convolutional layer and the at least one convolutional layer, and the shared feature extractor comprises multiple convolutional layers; and
        feeding training images through the shared feature extractor to each of the model heads.

2. The method of claim 1, wherein the discriminative deep counting model and the deep segmentation model are trained sequentially, wherein depending on an order of the training:
    an attention map generated by the trained discriminative deep counting model is used to train the deep segmentation model; or
    a segmentation map generated by the trained deep segmentation model is used to train the counting model.

3. The method of claim 1, wherein the discriminative deep counting model and the deep segmentation model are trained independently of each other,
    wherein forming the deep neural net comprises combining at least respective feature extractors of both models in a serial arrangement, and
    wherein each feature extractor comprises multiple convolutional layers.

4. The method of claim 1, wherein at least the discriminative deep counting model is trained with synthetic training images.

5. The method of claim 4, wherein the synthetic training images comprise images that are semantically similar to each other but visually different from each other, and
wherein two images are semantically similar to each other when the two images depict a same number of objects of the predetermined type, and two images are visually different from each other when at least 50% of corresponding pixels are different than each other.

6. The method of claim 5, wherein the synthetic training images comprise images that are semantically different from each other but are visually similar to each other, and
wherein two images are semantically different from each other when the two images depict different numbers of objects of the predetermined type, and two images are visually similar to each other when at least 50% of corresponding pixels are identical.

7. The method of claim 4, wherein the synthetic training images comprise images that are semantically similar to each other and images that are visually similar to each other but are not identical to each other, through different locations, scales, occlusions, or any combination thereof of one or more objects of the predetermined type, and
wherein two images are semantically similar to each other when the two images depict a same number of objects of the predetermined type, and two images are visually similar to each other when at least 50% of corresponding pixels are identical.

8. The method of claim 1, further comprising adding one or more skip connections to the deep segmentation model, the deep neural net, or the deep segmentation model and the deep neural net,
wherein each skip connection of the one or more skip connection connects a respective lower convolutional layer to a respective higher convolutional in a respective hierarchy of layers, such that data from the respective lower convolutional layer to the higher convolutional layer is provided.

9. A method for localizing any object of a predetermined type in an input image, the method comprising:
providing a deep neural net that combines parts of:
a discriminative counting model trained to classify images according to a number of objects of the predetermined type depicted in each of the images, wherein the discriminative counting model is trained for at least two different classes corresponding to different numbers of objects of the predetermined type; and
a segmentation model trained to segment images by classification of each pixel of a respective image according to what part of the respective image the respective pixel belongs to,
wherein the discriminative counting model and the segmentation model are trained in combination with each other, the training comprising:
arranging a counting model head and a segmentation model head in parallel with each other downstream of a shared feature extractor for the discriminative counting model and the segmentation model, wherein the counting model head comprises at least one fully connected layer, the segmentation model head comprises at least one transposed convolutional layer, at least one convolutional layer, or the at least one transposed convolutional layer and the at least one convolutional layer, and the shared feature extractor comprises multiple convolutional layers; and
feeding training images through the shared feature extractor to each of the model heads;
providing the input image as an input to the deep neural net;
capturing a map generated by the deep neural net as an output for the input image by processing the input image through the deep neural net, wherein any objects of the predetermined type depicted in the input image are indicated in the captured map; and
providing an upsampling module after a final convolutional layer of the deep neural net, wherein the upsampling module comprises an image processing algorithm based neither on machine learning nor on a neural net architecture, wherein the upsampling module is configured to take the generated map as an input and to generate, from the generated map, an upsampled map.

10. A controller comprising:
a processor configured to run a deep neural net for localizing objects of a predetermined type in an input image,
wherein the deep neural net is a combination of parts of a discriminative deep counting model and a segmentation model, wherein the deep neural net is structured, such that by process of the respective input image, a respective corresponding map indicating locations of any objects of the predetermined type for each processed input image is generated,
wherein the discriminative deep counting model is trained to classify images according to a number of objects of the predetermined type depicted in each of the images, wherein the discriminative deep counting model is trained for at least two different classes corresponding to different numbers of objects of the predetermined type,
wherein the deep segmentation model is trained to segment images by classification of each pixel of a respective image according to what part of the respective image the respective pixel belongs to, and
wherein an upsampling module is added after a final convolutional layer of the deep neural net, wherein the upsampling module comprises an image processing algorithm based neither on machine learning nor on a neural net architecture, wherein the upsampling module is configured to take the generated map as an input and to generate, from the generated map, an upsampled map.

11. The controller of claim 10, wherein the deep neural net is structured to process the input image and generate the corresponding map in a single forward pass of the input image through the deep neural net.

12. In a non-transitory computer-readable storage medium that stores instructions executable by one or more processors to generate a deep neural net for localizing objects of a predetermined type in an input image, the instructions comprising:
training a discriminative deep counting model to classify images according to a number of objects of the predetermined type depicted in each of the images, wherein the discriminative deep counting model is trained for at least two different classes corresponding to different numbers of objects of the predetermined type;
training a deep segmentation model to segment images, the training of the deep segmentation model comprising classifying each pixel of a respective image according to what part of the respective image the respective pixel belongs to;

forming the deep neural net, the forming of the deep neural net comprising combining parts of the discriminative deep counting model and the segmentation model to form the deep neural net, wherein the deep neural net is structured, such that by processing the respective input image, a respective corresponding map indicating locations of any objects of the predetermined type for each processed input image is generated; and adding an upsampling module after a final convolutional layer of the deep neural net, wherein the upsampling module comprises an image processing algorithm based neither on machine learning nor on a neural net architecture, wherein the upsampling module is configured to take the generated map as an input and to generate, from the generated map, an upsampled map.

13. The non-transitory computer-readable storage medium of claim 12, wherein the discriminative deep counting model and the deep segmentation model are trained sequentially, wherein depending on an order of the training:

an attention map generated by the trained discriminative deep counting model is used to train the deep segmentation model; or a segmentation map generated by the trained deep segmentation model is used to train the counting model.

14. The method of claim 6, wherein the two images are visually similar to each other when at least 70% of corresponding pixels are identical.

15. The method of claim 7, wherein two images are visually similar to each other when at least 70% of corresponding pixels are identical.

* * * * *